May 16, 1961 E. L. DECKER 2,984,103
LOAD INDICATOR AND ANCHOR FOR LOAD SUSTAINING LINES
Filed Nov. 9, 1956
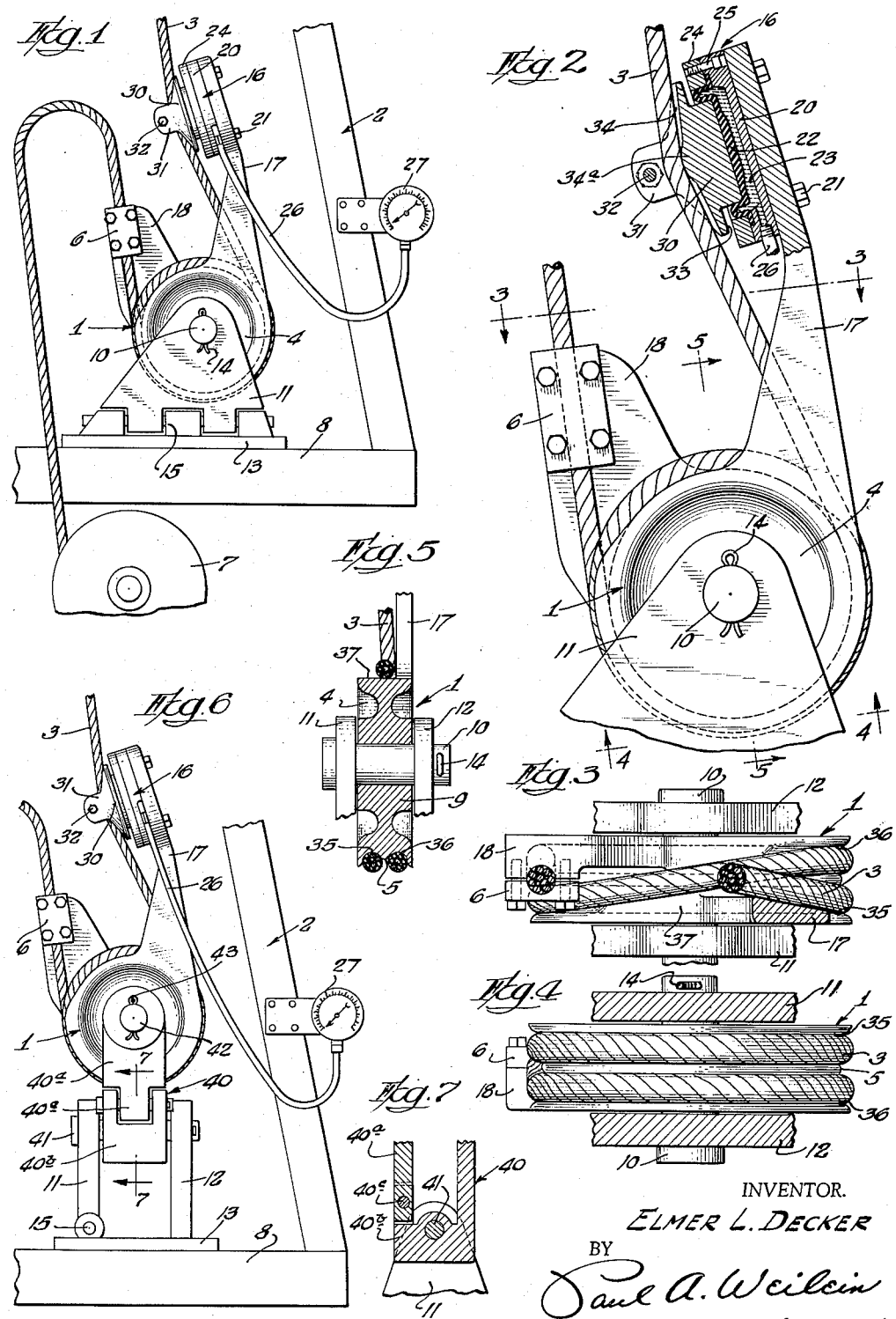
INVENTOR.
ELMER L. DECKER
BY
Paul A. Weilein
ATTORNEY.

United States Patent Office 2,984,103
Patented May 16, 1961

2,984,103

LOAD INDICATOR AND ANCHOR FOR LOAD SUSTAINING LINES

Elmer L. Decker, Long Beach, Calif., assignor to Martin-Decker Corporation, Long Beach, Calif., a corporation of Delaware Filed Nov. 9, 1956, Ser. No. 621,403

14 Claims. (Cl. 73—143)

This invention relates to load-indicating and anchoring devices for load-sustaining cables or lines in hoist systems of well drilling rigs and similar tackle.

Apparatus of the type to which the present invention relates is shown in an application for U.S. Letters Patent Serial No. 621,402 filed November 9, 1956 for Device for Snubbing and Anchoring a Load-Sustaining Line wherein a base mounts a load sensing unit and means including a lever for actuating the unit. The lever supports for rotative movement a snubbing and anchoring member adapted to have a load-sustaining line anchored in snubbing engagement therewith by means of line clamps. The line extends from the clamps to a reserve spool of the line. The load pull on the line moves the lever for actuating the sensing unit which in turn operates a gauge for indicating the load on the line. Incident to this movement on the lever, a rotary movement is imparted to the snubbing member by the load pull on the line. The rotative movement of the snubbing member is checked by an arm extending from the snubbing member so as to engage and be urged against the outer side of a portion of the line leading to the snubbing member. The snubbing action of the snubbing member and the rotation checking action of the arm make it possible for the operator to hold the snubbing member against rotation with very little effort when the clamps are removed, whereby the feeding of the fresh line through the device into the system readily and easily may be effected by appropriate manipulation of the line.

It is an object of the present invention to provide an improved load indicating and anchoring device of the character described that provides advantages of the apparatus above noted and is simplified as to construction and operation, made more compact and reduced in weight without sacrificing reliability and accuracy of performance, by mounting the load sensing unit in such relation to the rotative anchoring member, as to be engageable with a portion of the line leading to the anchoring member and the anchoring member respectively. With this arrangement, the sensing unit is urged against the anchoring member and the line responsive to the load pull on the line and the rotative moment of the anchoring member imparted by this load pull, thereby effecting a load sensing operation of the sensing unit and checking rotative movement of the anchoring member. The force being sensed is the line load-responsive force of the anchoring member required to deflect the line to such an extent that the load-sustaining line is aligned with the axis of rotation of the anchoring member.

It is another object of this invention to provide a device of the character described wherein the load sensing unit is conveniently carried by the rotative anchoring member so that it may be engaged and actuated by a portion of the line leading to the anchoring member and at the same time check rotative movement of the anchoring member for the purposes stated.

It is another object of this invention to provide a compact unitary device of the character described wherein a single rotative member embodies as parts thereof integral therewith or otherwise fixed thereon, a snubbing surface, clamping means for anchoring the load-sustaining line, and a load sensing unit operable to engage the line so that the unit is operated responsive to the load pull on the line and at the same time restrains rotative movement imparted to the rotative member by this load pull.

It is another object of this invention to provide a compact and simply constructed device of the character next above described which as a unitary structure comprises a generally circular body having means providing for the rotative mounting thereof on any suitable support, a snubbing surface and a pair of arms projecting therefrom for mounting line clamping means and the load sensing unit respectively.

This invention possesses many other advantages and has other objects which may be made more easily apparent from a consideration of the embodiments of the invention shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is an elevational view of a device embodying the present invention as it would appear when employed to indicate the load on the dead line of the hoist system of a well drilling rig;

Fig. 2 is an enlarged fragmentary elevational view partly in section of the device shown in Fig. 1;

Fig. 3 is a sectional view taken on the line 3—3 of Fig. 2;

Fig. 4 is a sectional view taken on the line 4—4 of Fig. 2;

Fig. 5 is a sectional view taken on the line 5—5 of Fig. 2 on a reduced scale;

Fig. 6 is an elevational view of the device as installed on a different form of mounting means than shown in Fig. 1; and Fig. 7 is a sectional view taken on the line 7—7 of Fig. 6.

A typical use of a load indicating and anchoring device embodying the present invention is shown in the accompanying drawing wherein an anchoring and snubbing member 1 is mounted for limited rotative movement on the derrick 2 of well drilling apparatus and is operable for anchoring and snubbing the dead line 3 of the hoist system.

The anchoring and snubbing member 1 includes a generally circular body 4 having a peripheral snubbing surface 5 around which turns of the line 3 are wrapped for snubbing the line.

As here shown, a line clamp 6 is carried by the member 1 for releasably clamping thereto the portion of the line leading from the snubbing surface 5. From the clamp 6, the line leads to a reserve spool 7 of fresh line suitably located adjacent the device.

Means are provided to mount the anchoring and snubbing member for rotative movement, for example on the derrick platform 8 as shown in Fig. 1. This means may be constructed as here shown to facilitate wrapping turns of the line around the snubbing surface 5. Accordingly, the body 4 of the member 1 is provided with a hub 9 through which a pin 10 extends to support the member 1 for rotative movement. This pin is supported by and between a pair of ears 11 and 12 on a base 13 bolted or otherwise fixed on the platform 8. A cotter pin 14 or similar element is provided to hold the pin in place and upon removal permits one end of the pin to be withdrawn from the ear 11. This ear is hinged as at 15 on the base and may be swung downwardly to permit the line to be wrapped around the snubbing surface 5 while the member 1 remains in place on the pin as the latter is held by the other ear 12.

As compactness, low weight and a minimum number of parts in a device such as described are desirable, these advantages are achieved by mounting the load sensing unit 16 so that it is interposed between and engaged by a part of the rotative member 1 and a portion of the line 3 leading to the member 1, respectively. As here shown, the member 1 is provided with an arm 17 for supporting the load sensing unit 16. This arm extends generally in the direction of the portion of the line 3 leading to the member 1 on the outer side thereof so that it forms an effective lever urged transversely towards the line as a function of the rotative movement of the member 1. By mounting the load sensing unit 16 on the outer end of the arm 17 so as to be engaged with the line 3, provision is made for the sensing unit to be operated by the load pull on the line and the leverage action of the arm 17, as well as for checking the rotative movement of the snubbing member 1. This load pull is ineffective to rotate the snubbing member 1 an appreciable extent, inasmuch as the sensing unit 16 and arm 17 are arranged so that in setting up the device for operation, the sensing unit will engage and deflect the line to a position such that the load pull will be transmitted through the axis of the snubbing member. Thus, although the load pull is ineffective to appreciably rotate the snubbing member, it is effective to actuate the sensing unit for sensing the load on the line.

An arm 18 extends from the member 1 and mounts the line clamp 6 thereby making the snubbing and anchoring device 1 a unitary structure in which all of the parts excepting the pin 10, ears 11 and 12 and base 13 are carried as a part of a "one-piece" structure subject to being rotatably mounted on any suitable support.

The load sensing unit 16, as here shown, comprises a body 20 secured by fastenings 21 on the inner side of the arm 16. This body is provided with a cavity which with a movable member 22 forms an expansible chamber 23 for hydraulic fluid. The movable member 22 is here shown in the form of a flexible diaphragm secured to the body 20 by a clamping ring 24 and fastenings 25. A fluid line 26 leads from the chamber 23 to a gauge 27 which may be calibrated to indicate the load on the line 3 in pounds, responsive to hydraulic pressure developed in the chamber 23. The load sensing unit includes a plate-like pressure member 30 which is engaged with and movable against the diaphragm 22. This pressure member is interposed between the portion of the line 3 leading to the member 1 and the diaphragm 22. Ears 31 on the pressure member 30 embrace the line 3 which latter is held between the ears by means of a pin 32 suitably removably secured to the ears. A stop flange 33 is provided on the pressure member 30 so as to engage the clamping ring 24 to limit movement of the pressure member in actuating the diaphragm 22. The member 30 may also be provided, as here shown, with a line-receiving groove 34 and a rounded line-engaging protuberance 34a located so that all load pulls on the line will cause the member 30 to actuate the diaphragm 22 in a manner assuring accurate indications at the gauge 27.

The snubbing surface 5 is defined by a pair of grooves 35 and 36 and a non-grooved arcuate peripheral portion 37 between the ends of the grooves. As here shown, the grooves 35 and 36 are parallel with one another. The line 3 is extended along the inner side of the arm 17 from the pressure member 30 so as to be engaged as a loop in the groove 35 and to cross over the ungrooved portion 37, then extend around the body 4 in the groove 36 and up along the arm 18 where it is clamped by the clamp 6. This arrangement assures an effective snubbing action and relieves the clamp 6 of heavy loading which would damage the line.

In the operation of the device, a load pull on the line 3 will impart a rotative moment to the member 1 and at the same time exert force on the member 30 for moving the diaphragm 22. The arm 17 at this time, is urged toward the line 3 by the slight rotative moment of the member 1 and the forces resulting from this moment of the lever and the load pull, cause the diaphragm 22 to be moved so that hydraulic pressure thereby developed in the chamber 23 is transmitted through the line 26 to the gauge 27. The gauge then indicates the line load, for example in pounds.

The snubbing action provided by the member 1 and the rotation checking action provided by the arm 17 and sensing unit 16 make it possible for an operator readily and easily to hold the free part of the line to prevent rotative movement of the member 1 when the clamp 6 is removed. This makes it possible for the operator to control the running of fresh line as required from the reserve spool 7 through the device into the system.

Figs. 6 and 7 show a modified form of the mounting means for an anchoring and snubbing member 1, which latter is identical with the snubbing and anchoring means shown in Fig. 1.

In this modified mounting means, the base structure thereof consisting of a pair of ears and a base wherein one ear is hinged to the base, is of the same construction as shown in Fig. 1. Accordingly, this base structure and the snubbing and anchoring element are identified by the same reference characters as in Fig. 1. The modification of the mounting means consists of a U-shaped clevis 40 pivotally mounted on a pin 41 corresponding to the pin 10 in Fig. 1. This clevis embraces the snubbing and anchoring member 1 and supports a pin 42 on which the member 1 is supported for rotative movement. The pin 42 is removably held in place by suitable means, for example a cotter pin 43. One arm of the clevis 40 is made in two sections 40a and 40b, joined by a hinge 40c. By removing the cotter pin 43, the pin 42 may be withdrawn from engagement with the section 40a of the clevis so that this section may be swung downward to permit the line 3 to be wrapped in desired snubbing engagement with the member 1, thereby facilitating the snubbing of the line on the member 1.

The clevis 40 in being pivotally mounted permits of self-alignment of the member 1 with the load sustaining line 3. In all other respects, the device operates in the same manner as shown in Fig. 1.

It should be noted that a snubbing and anchoring device embodying the present invention makes it unnecessary to employ a separate lever fulcrumed on a base as a mounting means for the snubbing and anchoring member and as a means for actuating the load sensing unit in the manner shown in the aforementioned pending application for patent. Accordingly, the device here shown may be said to consist of a unitary structure embodying snubbing means, line clamping means and a load sensing unit as integral parts thereof, thereby providing a much more compact and simple construction than heretofore embodied in load indicating and anchoring devices for load-sustaining lines.

I claim:

1. In a device for anchoring a load-sustaining line and sensing the load thereon: a drum adapted to be mounted for rotative movement on a support; said drum having a peripheral snubbing surface coaxial with said drum and adapted to have loops of said line engaged thereabout; means on said drum for anchoring said line thereto; an arm extending from said drum; and a load sensing unit carried by said arm directly engaging a portion of said line leading to said drum.

2. A device for anchoring a load sustaining line and sensing the load thereon comprising: a drum adapted to be mounted for rotative movement on a support; said drum having a snubbing surface coaxial with said drum and adapted to have said line therearound; means on said drum for releasably clamping a portion of said line leading from said snubbing surface; an arm extending from said drum; and a load sensing unit carried by said arm directly engaging a portion of said line leading to said snubbing surface.

3. In apparatus for indicating the load on a load-sustaining line; a drum having a snubbing surface coaxial with said drum and adapted to have turns of said line wrapped therearound; means for rotatably supporting said drum; means for anchoring said line to said drum; an arm extending from said drum; a load sensing unit for operating a gauge; and means mounting said unit on said arm for direct engagement with a portion of the line leading to said snubbing surface.

4. Apparatus for anchoring a load sustaining line and sensing a load on said line, comprising: a base; a member rotatably mounted on said base; said member having a snubbing surface extending about the axis of rotation of said member and adapted to have said line wrapped therearound; means on said member for releasably anchoring the line thereto; an arm positioned on said member to extend alongside a portion of the line leading to said snubbing surface; and load sensing means for sensing the load on said line, disposed between said portion of said line and said arm.

5. A device for anchoring a load sustaining line and indicating the load thereon, comprising: a base; a pair of ears on said base; means hingedly connecting one of said ears to said base; a pin removably supported by and between said ears; a member mounted to rotate on said pin; said member having a snubbing surface extending about the axis of rotation of said member and adapted to have said line wrapped therearound; means on said member for anchoring said line thereto; an arm extending from said member; and load sensing means carried by said arm for direct engagement with a portion of said line leading to said snubbing surface.

6. A device for anchoring a load sustaining line and indicating the load thereon, comprising: a base; a pair of ears on said base; a clevis pivotedly mounted on said ears; a member supported for rotative movement on said clevis; said member having a snubbing surface extending about the axis of rotation of said member and adapted to have said line wrapped therearound; means on said member for anchoring said line thereto; an arm on said member; and a load sensing unit mounted on said arm directly engaging a portion of said line leading to said snubbing surface.

7. A device for anchoring a load sustaining line and sensing the load thereon comprising: a member adapted to be mounted for rotative movement on a support; said member having a snubbing surface extending about the axis of rotation of said member and adapted to have said line wrapped therearound; a pair of arms extending from said member; means on said member for releasably clamping a portion of said line leading from said snubbing surface including a clamp on one of said arms for anchoring said line thereto; and a load sensing unit mounted on the other of said arms for direct engagement with and actuation by a portion of the line leading to said snubbing surface.

8. A device for anchoring a load sustaining line and indicating the load thereon comprising: a base; an anchoring and snubbing member; means mounting said member for rotative movement on said base; said member having a circumferential snubbing surface extending about the axis of rotation of said snubbing member and adapted to have said line wrapped therearound; means on said member offset from said surface for releasably clamping thereto a portion of said line leading from said surface; a load sensing unit; and means on said member offset from said surface and mounting said unit so that said unit will be urged against and actuated by a portion of the line leading to said surface responsive to the load pull on said line.

9. A device for anchoring a load sustaining line and indicating the load thereon comprising: a snubbing and anchoring member; means mounting said member for rotative movement; said member having a snubbing surface extending about the axis of rotation of said member and adapted to have said line wrapped therearound; means on said member for clamping thereto a portion of the line leading from said snubbing surface; said snubbing surface and said clamping means being arranged so that a rotative moment is imparted to said member responsive to the load pull on the line; and load indicating means including a load sensing unit carried by said member for deflecting a portion of said line leading to said surface; said sensing unit maintaining said line in a position such that a load pull on the line passes through the axis of said snubbing and anchoring member.

10. In a device for anchoring a load sustaining line and indicating the load thereon; a snubbing member; means mounting said member for rotative movement; said member having a snubbing surface extending about the axis of rotation of said member; means for anchoring said line in snubbing engagement with said snubbing surface; a hydraulic load sensing unit for actuating a load indicator; said unit including a pair of relatively movable elements defining therebetween an expansible chamber for hydraulic fluid; means mounting said elements between said snubbing member and said line with one of said elements arranged to be movable by engagement thereof with said line to create hydraulic pressure in said chamber responsive to the load pull on said line; said engagement of said element with said line normally deflecting said line to a position such that the load pull which creates said hydraulic pressure, passes through the axis of said snubbing member.

11. In a device for anchoring a load sustaining line and indicating the load thereon; a snubbing member; means mounting said member for rotative movement; said member having a snubbing surface extending about the axis of rotation of said member; means for anchoring said line in snubbing engagement with said snubbing surface; a hydraulic load sensing unit for actuating a load indicator; said sensing unit including a pair of relatively movable elements defining therebetween an expansible chamber for hydraulic fluid; an arm extending from said member; and means mounting said elements between and in operative engagement with said arm and said line respectively for relative movement responsive to the load pull on the line; one of said relatively movable elements normally deflecting said line to a position such that the load pull on the line passes through the axis of said snubbing member.

12. In a device for anchoring a load sustaining line and indicating the load thereon; a snubbing member having a snubbing surface extending about the axis of rotation of said member and adapted to have said line wrapped therearound; means mounting said member for rotative movement; a line clamp on said member for releasably clamping a portion of the line leading from said snubbing member; a load sensing unit including a hydraulic expansible chamber; an arm on said member movable toward a portion of the line leading to said snubbing member; means mounting said chamber on said arm; said chamber including a diaphragm; and an element engaged with said diaphragm and engageable with and movable by said line to move said diaphragm for creating hydraulic pressure in said chamber responsive to the load pull on said line.

13. In combination: a load sustaining line; an hydraulically operated load indicator; a snubbing member having a snubbing surface extending about the axis of rotation of said member and adapted to have said line wrapped therearound; means mounting said member for rotative movement; means for releasably anchoring said line in snubbing engagement with said snubbing member;

a hydraulic load sensing unit; an arm on said snubbing member movable toward a portion of said line leading to said snubbing member; said load sensing unit including relatively movable elements defining therebetween an expansible chamber for hydraulic fluid; means operatively connecting said chamber with said indicator; means mounting said elements between said arm and said line; one of said elements normally deflecting said line to a position such that said line will effect relative movement between said members to develop hydraulic pressure in said chamber responsive to the load pull on said line.

14. In combination: a load sustaining line; an hydraulically operated load indicator; a snubbing member having a snubbing surface extending about the axis of rotation of said member and adapted to have said line wrapped therearound; a clamp on said member for releasably anchoring a portion of the line leading from said snubbing surface; means mounting said member on a support; an arm on said snubbing member extending toward a load sustaining portion of the line leading to said snubbing member; an expansible hydraulic chamber on said arm including a diaphragm; means operatively connecting said chamber with said indicator; and a pressure applying element interposed between and engaged with said load sustaining portion of said line and said diaphragm respectively; said pressure applying element normally deflecting said line to a position such that said pressure applying element is operable responsive to the load pull on said line to move said diaphragm for developing hydraulic pressure for operating said indicator.

References Cited in the file of this patent

UNITED STATES PATENTS

| | | |
|---|---|---|
| 1,428,118 | Robeson et al. | Sept. 5, 1922 |
| 2,324,769 | Davis | July 20, 1943 |
| 2,488,070 | Spalding | Nov. 15, 1949 |
| 2,807,957 | Decker | Oct. 1, 1957 |